(12) United States Patent
Kawashita et al.

(10) Patent No.: US 10,745,060 B2
(45) Date of Patent: Aug. 18, 2020

(54) VEHICLE PILLAR STRUCTURE AND METHOD FOR MANUFACTURING VEHICLE PILLAR

(71) Applicant: TOYOTA JIDOSHA KABUSHIKI KAISHA, Aichi-ken (JP)

(72) Inventors: Yuki Kawashita, Okazaki (JP); Shinichi Washizu, Aichi-pref. (JP); Yosuke Tateya, Toyota (JP); Daisuke Noritake, Nagoya (JP); Masanori Kokume, Okazaki (JP); Jun Ikarashi, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 9 days.

(21) Appl. No.: 16/273,157

(22) Filed: Feb. 12, 2019

(65) Prior Publication Data

US 2019/0256155 A1 Aug. 22, 2019

(30) Foreign Application Priority Data

Feb. 20, 2018 (JP) .................... 2018-028173

(51) Int. Cl.
| | |
|---|---|
| *B62D 25/04* | (2006.01) |
| *B62D 65/00* | (2006.01) |
| *B23K 26/32* | (2014.01) |
| *B23K 26/242* | (2014.01) |
| *B23K 11/16* | (2006.01) |
| *B23K 11/00* | (2006.01) |
| *B23K 11/11* | (2006.01) |
| *B23K 26/22* | (2006.01) |
| *F16B 5/08* | (2006.01) |

(Continued)

(52) U.S. Cl.
CPC .......... *B62D 25/04* (2013.01); *B23K 11/0026* (2013.01); *B23K 11/115* (2013.01); *B23K 11/16* (2013.01); *B23K 26/22* (2013.01); *B23K 26/242* (2015.10); *B23K 26/32* (2013.01); *B62D 65/00* (2013.01); *B23K 11/11* (2013.01); *B23K 2101/006* (2018.08); *B23K 2101/185* (2018.08); *B23K 2103/04* (2018.08); *B29C 66/1122* (2013.01); *F16B 5/08* (2013.01)

(58) Field of Classification Search
CPC ................................. B62D 25/04; B62D 65/00
USPC ...................................................... 296/193.06
See application file for complete search history.

(56) References Cited

U.S. PATENT DOCUMENTS

| | | | |
|---|---|---|---|
| 4,993,619 A | 2/1991 | Kresse, Jr. et al. | |
| 5,221,585 A | 6/1993 | Kresse, Jr. et al. | |

(Continued)

FOREIGN PATENT DOCUMENTS

JP    H3-133582 A    6/1991

*Primary Examiner* — Jason S Morrow
(74) *Attorney, Agent, or Firm* — Hauptman Han, LLP (57) ABSTRACT

A vehicle pillar structure and a method for manufacturing a vehicle pillar in which, in a pillar framework, a member is easily disposed on a surface facing a transparent panel in an overlapping manner, while reducing the width of the pillar framework, and a corner butt portion on the side of the transparent panel has increased welding accuracy are provided. A flange of an outer panel and a flange of an inner panel are welded by spot welding. An end surface of a front end of the inner panel is butted against an inner surface end of the outer panel, and is welded thereto by laser welding, such that welding beads are thereby linearly formed at established intervals.

4 Claims, 6 Drawing Sheets

(51) Int. Cl.
*B29C 65/00* (2006.01)
*B23K 103/04* (2006.01)
*B23K 101/00* (2006.01)
*B23K 101/18* (2006.01)

(56) References Cited

U.S. PATENT DOCUMENTS

| | | | |
|---|---|---|---|
| 5,532,451 A * | 7/1996 | La Rocca | B21C 37/0803 219/121.64 |
| 5,878,940 A * | 3/1999 | Rosenbalm | B23K 31/02 228/135 |
| 2018/0273103 A1* | 9/2018 | Komoriya | B62D 27/04 |
| 2018/0273104 A1* | 9/2018 | Ikeda | B62D 25/04 |
| 2019/0126986 A1* | 5/2019 | Ikeda | B62D 29/005 |
| 2019/0136886 A1* | 5/2019 | Kawashita | F16B 5/08 |
| 2019/0144042 A1* | 5/2019 | Sakabe | B62D 25/04 296/203.02 |
| 2019/0152419 A1* | 5/2019 | Tanaka | B62D 25/04 |
| 2019/0217899 A1* | 7/2019 | Ikeda | B62D 25/04 |
| 2019/0217900 A1* | 7/2019 | Ikeda | B60J 1/10 |
| 2019/0233018 A1* | 8/2019 | Tanaka | B60R 21/213 |
| 2019/0256155 A1* | 8/2019 | Kawashita | B23K 26/32 |

* cited by examiner

VEHICLE PILLAR STRUCTURE AND METHOD FOR MANUFACTURING VEHICLE PILLAR

CROSS-REFERENCE TO RELATED APPLICATION

This application is based on and claims priority under 35 USC 119 from Japanese Patent Application No. 2018-028173 filed on Feb. 20, 2018, the disclosure of which is incorporated by reference herein.

BACKGROUND

Technical Field

The present invention relates to a vehicle pillar structure and a method for manufacturing a vehicle pillar.

Related Art

A method for forming a framework of a vehicle pillar, having a closed cross-section, is known. For example, Japanese Patent Application Laid-Open No. 3-133582 (Patent Document 1) discloses a method for forming a framework of a vehicle pillar, by welding end portions of two panels to each other. To be brief, in this technology, the two panels are joined at their flanged one end portions to each other. At the other end portions of the two panels, notches and projections are alternately formed. The projections are engaged in the notches. The projections are configured to be longer than the thickness of the engaged panel. In an engaged state, tip end projecting portions of the projections and the panel in which the projections are engaged are welded continuously. The prior art allows a reduction in the width of the vehicle pillar, while the vehicle pillar maintains sufficient stiffness, owing to elimination of flanges in the other end portions of the two panels.

However, in the prior art, in a case where the corner portion in which the projections are engaged in the notches is disposed on the side of a transparent panel, e.g. a windshield or the like, the tip end projecting portions of the projections, which protrude on the side of the transparent panel, and beads of the welded portions to weld the projecting portions are convexed on the side of the transparent panel. This has a disadvantage in disposing a member on a surface facing the transparent panel in an overlapping manner in the framework of the vehicle pillar.

On the other hand, in the framework of the vehicle pillar, in a case where a corner butt portion on the side of the transparent panel is welded, if a welding area is continuous and long, a heat distortion tends to occur, thus being susceptible to improvement in terms of welding accuracy.

SUMMARY

Considering the above circumstances, the present disclosure aims at providing a vehicle pillar structure and a method for manufacturing a vehicle pillar in which a member is easily disposed on a surface facing a transparent panel in an overlapping manner in a pillar framework, while reducing the width of the pillar framework, and in which a corner butt portion on the side of the transparent panel in the pillar framework has increased welding accuracy.

A vehicle pillar structure according to a first aspect includes a first panel that configures a part of a hollow columnar pillar framework disposed on an edge of a window opening in a vehicle side portion, the first panel including an outer wall having an outward surface covered with a lateral widthwise end portion of a transparent panel for covering the window opening; a second panel that configures a part of the pillar framework, the first panel and the second panel forming a closed cross-sectional structure by welding; a first welded portion at which a first end that is one end of the first panel in a longitudinal direction of the pillar framework is welded to one end of the second panel, the first end being provided in a portion other than the outer wall; and a second welded portion at which an end surface of the other end of the second panel is butted against and welded to a second end that is the other end of the first panel in the longitudinal direction of the pillar framework, the second end being located in an opposite surface to the outward surface of the outer wall, welding beads being linearly formed at established intervals to form the second welded portions.

According to the above structure, the hollow columnar pillar framework that is disposed on the edge of the window opening in the vehicle side portion is configured to include the first panel. The outward surface of the outer wall of the first panel is covered with the lateral widthwise end portion of the transparent panel for covering the window opening. The second panel configures a part of the pillar framework. The first panel and the second panel form the closed cross-sectional structure by welding.

At the first welded portion, the first end, which is the one end of the first panel in the longitudinal direction of the pillar framework and which is provided in the portion other than the outer wall, is welded to the one end of the second panel. At the second welded portions, the end surface of the other end of the second panel is butted against and welded to the second end, which is the other end of the first panel in the longitudinal direction of the pillar framework and which is located in the opposite surface to the outward surface of the outer wall. Since the butted and welded portions eliminate the need for providing welding flanges, it is possible to reduce the width of the pillar framework. Since the end surface of the other end of the second panel is butted against and welded to the second end, which is located in the opposite surface to the outward surface of the outer wall of the first panel, the welding beads formed by welding do not face the transparent panel. Therefore, in the pillar framework, the surface that faces the lateral widthwise end portion of the transparent panel becomes continuous and flat.

Furthermore, in the second welded portions, the welding beads are linearly formed at established intervals. Therefore, the total quantity of heat during welding is reduced, as compared with that in a continuous welded portion, as well as the heat can be dissipated into non-welded portions between the welding beads during the welding. Therefore, it is possible to reduce a heat distortion caused by welding, thus allowing an improvement in welding accuracy.

In a vehicle pillar structure according to a second aspect, based on the structure of the first aspect, the first welded portions are linearly provided at established intervals in an overlapping portion between a first flange that configures the first end of the first panel and a second flange that configures the one end of the second panel. The sum of welding areas of the second welded portions is set larger than the sum of welding areas of the first welded portions.

According to the above structure, since the first welded portions are linearly provided at the established intervals in the overlapping portion between the first flange of the first panel and the second flange of the second panel, a heat distortion caused by welding can be reduced even in the vicinity of the first welded portions. Since the sum of the welding areas of the second welded portions is set larger than the sum of the welding areas of the first welded portions, it is possible to easily increase the strength of the butted and welded second welded portions.

In a method for manufacturing a vehicle pillar according to a third aspect, the vehicle pillar has a first panel and a second panel. The first panel configures a part of a hollow columnar pillar framework disposed on an edge of a window opening in a vehicle side portion. The first panel includes an outer wall having an outward surface covered with a lateral widthwise end portion of a transparent panel for covering the window opening. The second panel configures a part of the pillar framework. The first panel and the second panel form a closed cross-sectional structure by welding. The method includes the steps of welding a first end that is one end of the first panel in a longitudinal direction of the pillar framework to one end of the second panel, the first end being provided in a portion other than the outer wall; and butting and welding an end surface of the other end of the second panel against and to a second end that is the other end of the first panel in the longitudinal direction of the pillar framework, the second end being located in an opposite surface to the outward surface of the outer wall, welding beads being linearly formed at established intervals by the welding.

According to the above structure, the first end, which is the one end of the first panel in the longitudinal direction of the pillar framework and which is provided in the portion other than the outer wall, is welded to the one end of the second panel. The end surface of the other end of the second panel is butted against and welded to the second end, which is the other end of the first panel in the longitudinal direction of the pillar framework and which is located in the opposite surface to the outward surface of the outer wall. Since the butted and welded portions eliminate the need for providing welding flanges, it is possible to reduce the width of the pillar framework. Since the end surface of the other end of the second panel is butted against and welded to the second end, which is located in the opposite surface to the outward surface of the outer wall of the first panel, the welding beads formed by the welding do not face the transparent panel. Therefore, in the pillar framework, the surface that faces the lateral widthwise end portion of the transparent panel becomes continuous and flat. Furthermore, in the welding between the second end of the first panel and the end surface of the other end of the second panel, the welding beads are linearly formed at the established intervals. Therefore, the total quantity of heat during the welding is reduced, as compared with that in a continuously welded portion, as well as the heat can be dissipated into non-welded portions between the welding beads during the welding. Therefore, it is possible to reduce a heat distortion caused by welding, thus allowing an improvement in welding accuracy.

A method for manufacturing the vehicle pillar according to a fourth aspect, based on the third aspect, includes the step of performing linear welding at established intervals in an overlapping portion between a first flange that configures the first end of the first panel and a second flange that configures the one end of the second panel. The sum of welding areas of welded portions between the other end of the first panel and the other end of the second panel is set larger than the sum of welding areas of welded portions between the first flange of the first panel and the second flange of the second panel.

According to the above structure, since the welding is linearly performed at the established intervals in the overlapping portion between the first flange that configures the first end of the first panel and the second flange that configures the one end of the second panel, a heat distortion caused by the welding can be reduced even in the vicinity of the welded portions. Since the sum of the welding areas of the welded portions between the other end of the first panel and the other end of the second panel is set larger than the sum of the welding areas of the welded portions between the first flange of the first panel and the second flange of the second panel, it is possible to easily increase the strength of the butted and welded portions.

As described above, the present disclosure has the beneficial effects that, in the pillar framework, the member is easily disposed on the surface facing the transparent panel in an overlapping manner, while reducing the width of the pillar framework, and the corner butt portion on the side of the transparent panel has increased welding accuracy.

DETAILED DESCRIPTION

First Embodiment

A vehicle pillar structure and a method for manufacturing a vehicle pillar according to a first embodiment of the present disclosure will be described with reference to FIGS. 1 to 3. Note that, arrows FR that are appropriately shown in the drawings represent a vehicle front side, arrows UP represent a vehicle upper side, and arrows RH represent a vehicle right side.

Figure 1:
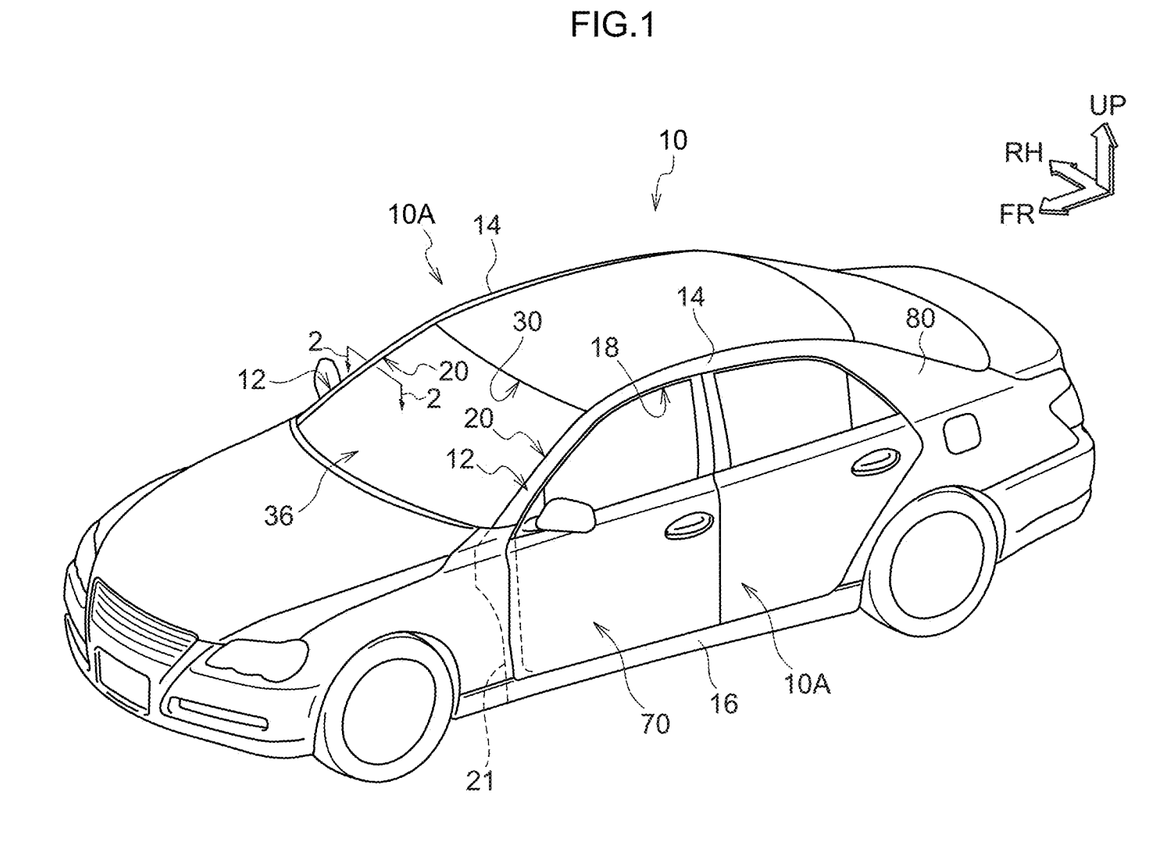
FIG. 1 is an external perspective view of a vehicle having a vehicle pillar structure according to a first embodiment of the present disclosure.

FIG. 1 is an external perspective view of a vehicle 10 having the vehicle pillar structure according to the present embodiment. As shown in the drawing, front pillars 12, as pillars, are provided in front portions of vehicle side portions 10A. The front pillar 12 is disposed along a vehicle vertical direction at a front edge of a front door opening 18 of the vehicle side portion 10A. The front pillar 12 is connected to a front end of a roof side rail 14 at its upper end, and is connected to a front end of a rocker 16 at its lower end. Note that, the roof side rail 14 extends in an upper portion of the vehicle side portion 10A along a vehicle longitudinal direction, and the rocker 16 extends in a lower portion of the vehicle side portion 10A along the vehicle longitudinal direction. A front side door 70 opens and closes the front door opening 18.

The front pillar 12 includes a pillar lower framework 21 that is erected approximately vertically, at its lower portion. The front pillar 12 includes a pillar upper framework 20, at its upper portion, as a pillar framework. The pillar upper framework 20 is connected to an upper end of the pillar lower framework 21, and is upwardly inclined to a vehicle rear side. Both of the pillar upper framework 20 and the pillar lower framework 21 are in the shape of a hollow column. The pillar upper framework 20 is disposed on a vertical edge of a front side window opening 30 into which a windshield 36, as a transparent panel, is fitted. The windshield 36 is fitted between a pair of the left and right pillar upper frameworks 20, so that the windshield 36 covers the window opening 30.

Next, the pillar upper framework 20 will be described. FIG. 2 is an enlarged sectional view showing a cross section taken along line 2-2 of FIG. 1. FIG. 3 is a perspective view of a part (longitudinal middle portion) of the pillar upper framework 20, in a state before the pillar upper framework 20 is secured to a predetermined position of the vehicle. As shown in FIGS. 2 and 3, the pillar upper framework 20 includes an outer panel 22 as a first panel, and an inner panel 24 as a second panel. Each of the outer panel 22 and the inner panel 24 is made of a metal plate (for example, an ultra-high tensile steel plate).

Figure 2:
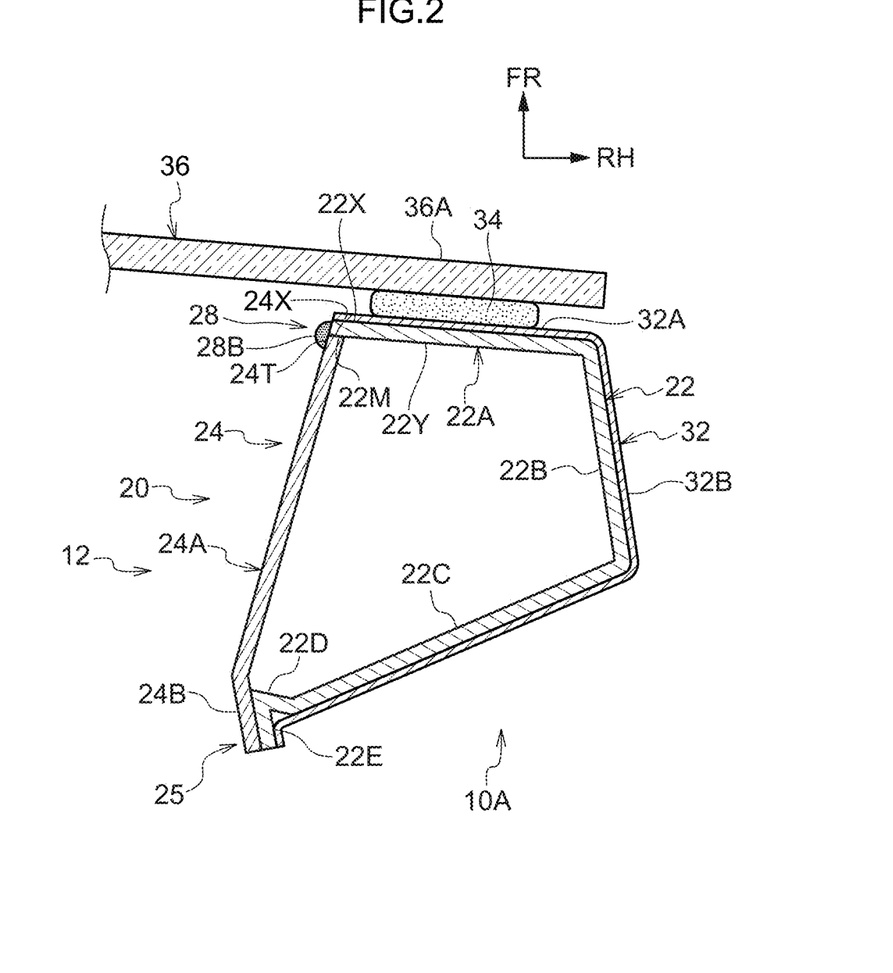
FIG. 2 is an enlarged sectional view showing a cross section taken along line 2-2 of FIG. 1.

As shown in FIG. 2, the outer panel 22 is formed so as to have an opened cross section that is opened inside in a vehicle widthwise direction, on the whole. The outer panel 22 is configured to include a front wall 22A, as an outer wall, having an outward surface 22X, which is covered with a lateral widthwise end portion 36A of the windshield 36. The outer panel 22 includes a side wall 22B that extends from a vehicle widthwise outer end of the front wall 22A in a curved manner to the vehicle rear side, and a rear wall 22C that extends from a rear end of the side wall 22B in an inwardly curved manner in the vehicle widthwise direction to an obliquely rear side. A flange 22E, as a first flange, is formed at a rear end of the outer panel 22. A front end of the flange 22E is joined to a vehicle widthwise inner end of the rear wall 22C via a coupling portion 22D. In addition, the flange 22E configures a first end that is one end of the outer panel 22, when viewed in the longitudinal direction of the pillar upper framework 20 (when viewed in the direction of FIG. 2), and that is provided in a portion other than the front wall 22A.

The inner panel 24 is disposed inside the outer panel 22 in the vehicle widthwise direction. The inner panel 24 and the outer panel 22 form a closed cross-sectional structure by welding. The inner panel 24 includes an inner wall 24A that configures a major portion of the inner panel 24, and a flange 24B as a second flange. The inner wall 24A is slightly inwardly inclined in the vehicle widthwise direction to the vehicle rear side. The flange 24B is slightly outwardly inclined in the vehicle widthwise direction to the vehicle rear side. The flange 24B configures one end of the inner panel 24.

Figure 3:
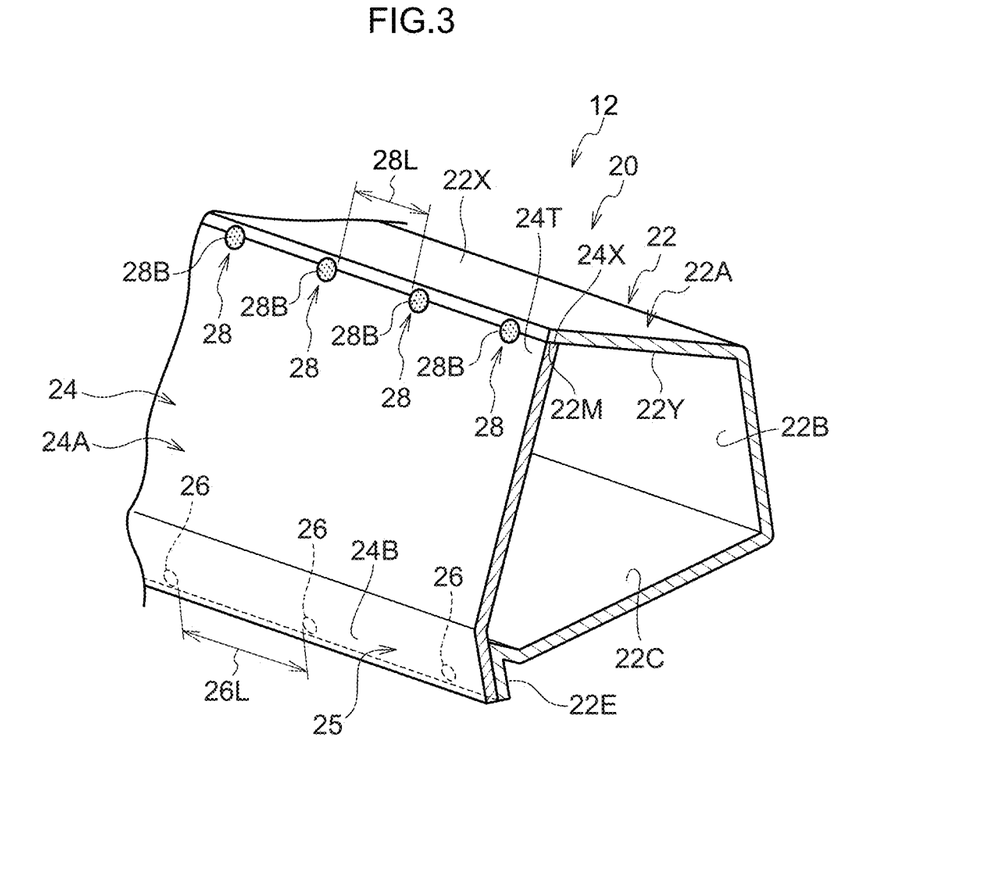
FIG. 3 is a perspective view showing a part of a pillar upper framework shown in FIG. 1, in a state before the pillar upper framework is secured to a predetermined position of the vehicle.

As shown in FIG. 3, the flange 22E of the outer panel 22 and the flange 24B, which configures the one end of the inner panel 24, are welded by spot welding. The welded portions are hereinafter referred to as first welded portions 26. The first welded portions 26 are linearly formed in an overlapping portion 25 between the flange 22E of the outer panel 22 and the flange 24B of the inner panel 24 at intervals of a predetermined distance 26L.

As shown in FIG. 2, an end surface 24X of a front end 24T, i.e. the other end, of the inner panel 24 is butted against and welded to an inner surface end 22M, as a second end, that is the other end of the outer panel 22, when viewed in the longitudinal direction of the pillar upper framework 20 (when viewed in the direction of FIG. 2), and that is located in an opposite surface 22Y to the outward surface 22X of the front wall 22A. The welded portions are hereinafter referred to as second welded portions 28. As shown in FIG. 3, to form the second welded portions 28, welding beads 28B are linearly formed by welding at intervals of a predetermined distance 28L.

The distance 28L between the second welded portions 28 adjacent each other is set narrower than the distance 26L between the first welded portions 26 adjacent each other. The sum of welding areas of the second welded portions 28 is set larger than the sum of welding areas of the first welded portions 26.

As shown in FIG. 2, a part of a side outer panel 32 (also referred to as a "side member outer panel") is adjacently disposed outside the outer panel 22 in a secured manner. The side outer panel 32 is a panel that configures an outside plate of the vehicle side portion 10A. The side outer panel 32 is disposed along an external surface of the outer panel 22. The side outer panel 32 includes a front wall 32A that is overlapped with the front wall 22A of the outer panel 22. To the front wall 32A of the side outer panel 32, the end portion 36A of the windshield 36 is bonded through an adhesive 34.

Next, a method for manufacturing the front pillar 12, as a vehicle pillar, having the outer panel 22 and the inner panel 24 will be described, as well as the operation and effects of the present embodiment will be described.

In a method for manufacturing the front pillar 12 according to the present embodiment, as shown in FIG. 3, the flange 22E of the outer panel 22 and the flange 24B of the inner panel 24 are welded by spot welding. The end surface 24X of the front end 24T of the inner panel 24 is butted against and welded to the inner surface end 22M of the outer panel 22 by laser welding, such that the welding beads 28B are thereby formed linearly (in other words, in a stitched manner) at intervals of the predetermined distance 28L. Note that, in the spot welding, while a not-illustrated pair of spot guns catch and press a welding target, a current is fed between the pair of spot guns. In the laser welding, a laser beam is applied from a not-illustrated welding torch to a welding target.

Since the butted and welded portions eliminate the need for providing welding flanges, the width of the pillar upper framework 20 can be thereby reduced. As shown in FIG. 2, the end surface 24X of the front end 24T of the inner panel 24 is butted against and welded to the inner surface end 22M located in the opposite surface 22Y to the outward surface 22X of the front wall 22A of the outer panel 22. Therefore, the welding beads 28B formed by the welding do not face the windshield 36, but face a side approximately orthogonal to the windshield 36, when viewed in the longitudinal direction of the pillar upper framework 20 (when viewed in the direction of FIG. 2). Accordingly, in the pillar upper framework 20, the surface facing the lateral widthwise end portion 36A of the windshield 36 becomes continuous and flat. Furthermore, as shown in FIG. 3, since the welding beads 28B are linearly formed at intervals of the predetermined distance 28L in welding between the inner surface end 22M of the outer panel 22 and the end surface 24X of the front end 24T of the inner panel 24, the total quantity of heat during the welding is reduced, as compared with the case of, for example, continuous welding, as well as the heat can be dissipated into non-welded portions between the welding beads 28B during the welding. Therefore, it is possible to reduce a heat distortion caused by welding, thus allowing an improvement in welding accuracy.

As described above, according to the present embodiment, in the pillar upper framework 20, while the pillar upper framework 20 has a reduced width, the member can be easily disposed on the outward surface 22X facing the windshield 36 (refer to FIG. 2) in an overlapping manner, and the corner butt portion on the side of the windshield 36 (refer to FIG. 2) can have improved welding accuracy.

In the pillar upper framework 20, as shown in FIG. 2, since the surface facing the lateral widthwise end portion 36A of the windshield 36 is continuous and flat, the front wall 32A of the side outer panel 32 can be favorably overlapped with the outward surface 22X. Therefore, the windshield 36 can favorably adhere to the front pillar 12.

According to the present embodiment, as shown in FIG. 3, in the overlapping portion 25 of the flange 22E of the outer panel 22 and the flange 24B of the inner panel 24, welding is linearly performed at intervals of the predetermined distance 26L. Therefore, it is possible to prevent a heat distortion owing to welding, even in the vicinity of the welded portions, i.e. the first welded portions 26.

Furthermore, the sum of the welding areas of the second welded portions 28, which are welded portions between the inner surface end 22M of the outer panel 22 and the front end 24T of the inner panel 24, is set larger than the sum of welding areas of the first welded portions 26, which are welded portions between the flange 22E of the outer panel 22 and the flange 24B of the inner panel 24. Therefore, the strength of the butted and welded second welded portions 28 can be easily increased.

The vehicle pillar structure according to the present embodiment does not have any flanges to join the front wall 22A of the outer panel 22 and the inner wall 24A of the inner panel 24. The elimination of flanges brings about an increase in the cross-sectional area of the pillar upper framework 20. An increase in the cross-sectional area of the pillar upper framework 20 allows an improvement in the stiffness of the pillar upper framework 20. Since an increased cross-sectional area of the pillar upper framework 20 brings about an increased stiffness of the pillar upper framework 20, both of the outer panel 22 and the inner panel 24, or one of the outer panel 22 or the inner panel 24 can be thin in thickness. Thinning the panels or panel facilitates reducing the weight of the pillar upper framework 20. Furthermore, a reduction in the width of the pillar upper framework 20 allows an improvement in the vehicle outside visibility of occupants.

Second Embodiment

Figure 4:
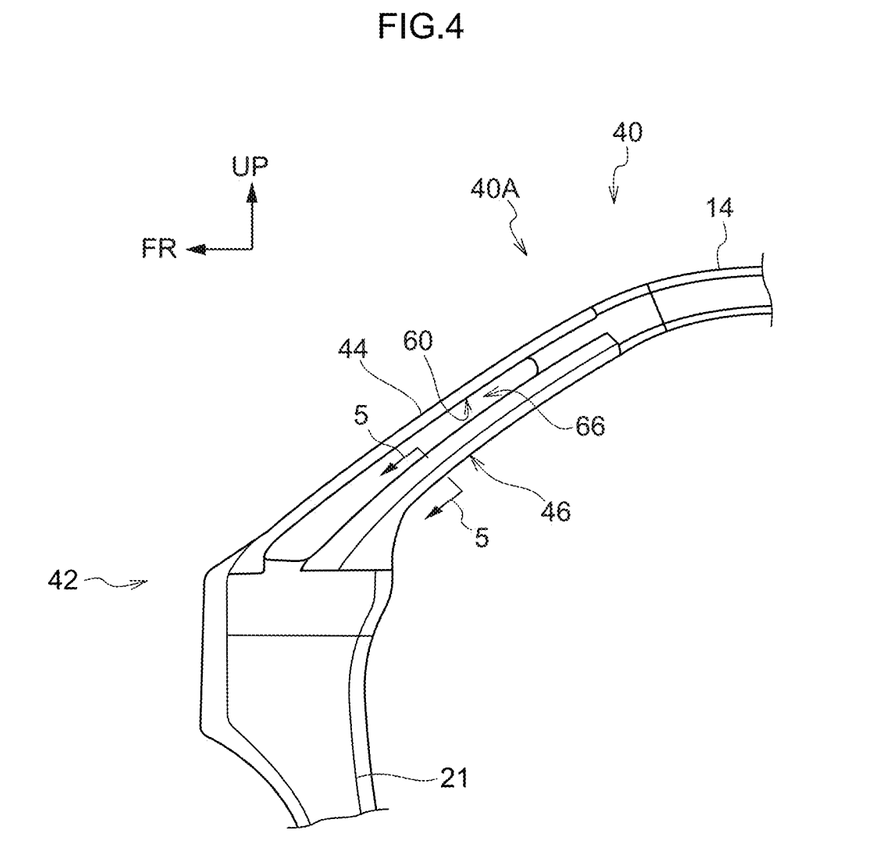
FIG. 4 is a schematic side view of a part of a vehicle side portion having a vehicle pillar structure according to a second embodiment of the present disclosure, when viewed from the inside in a vehicle widthwise direction.
Figure 5:
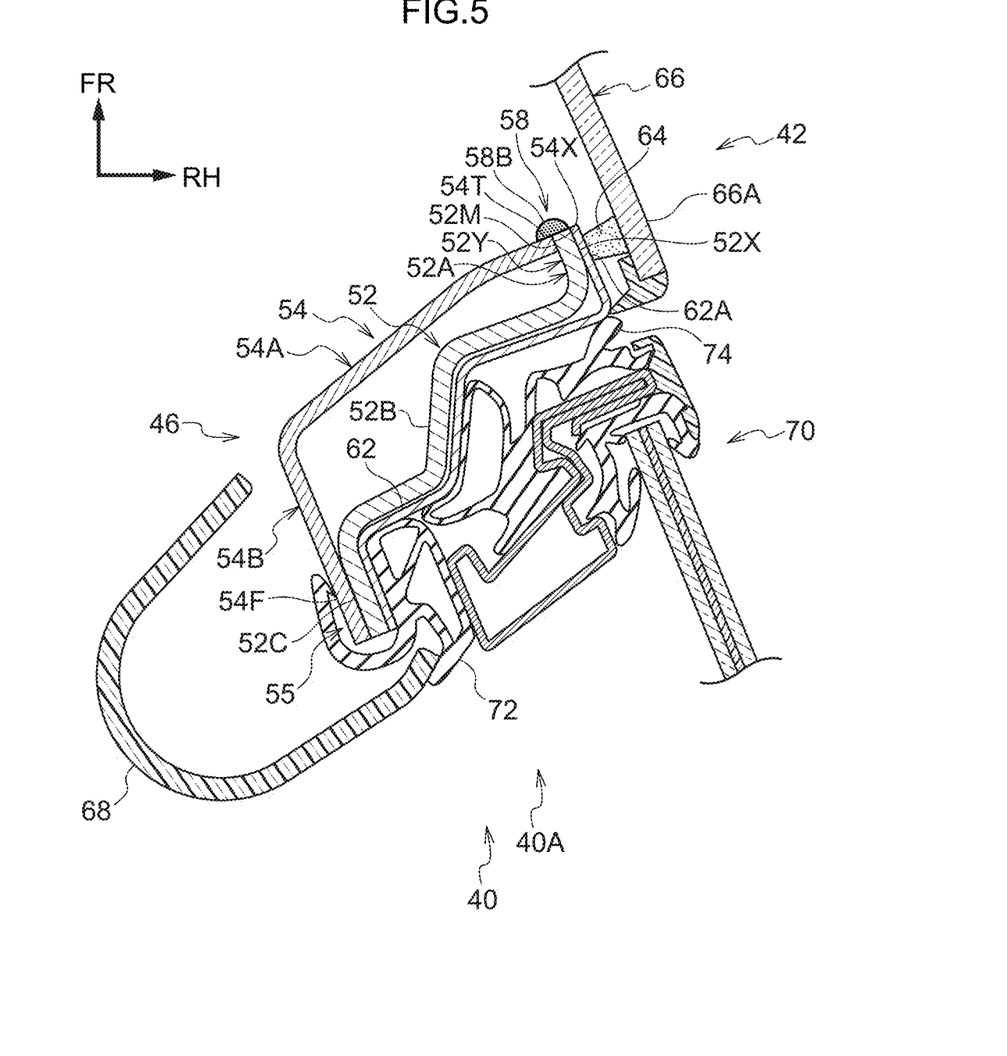
FIG. 5 is an enlarged sectional view showing a cross section taken along line 5-5 of FIG. 4.
Figure 6:
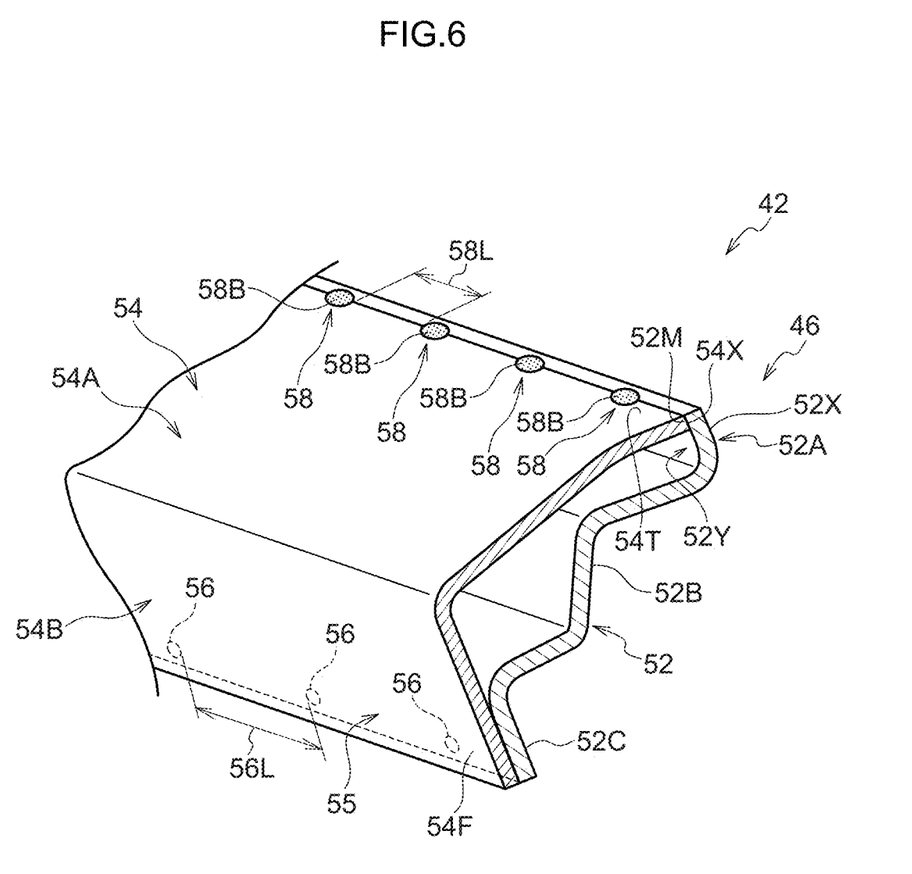
FIG. 6 is a perspective view showing a part of a rear framework shown in FIG. 4, in a state before the rear framework is secured to a predetermined position of the vehicle.

Next, a vehicle pillar structure and a method for manufacturing a vehicle pillar according to a second embodiment of the present disclosure will be described with reference to FIGS. 4 to 6. FIG. 4 is a schematic side view of a part of a vehicle side portion 40A having a vehicle pillar structure according to the present embodiment, when viewed from the inside in the vehicle widthwise direction. Components that are substantially identical to those of the first embodiment are indicated with the same reference numerals, and a description thereof is omitted. FIGS. 4 to 6 show a structure on the right side of a vehicle 40, and do not show a structure on the left side of the vehicle 40. In the present embodiment, by way of example, the structure on the left side of the vehicle 40 is symmetrical to the structure on the right side of the vehicle 40.

As shown in FIG. 4, a front pillar 42, as a pillar, is provided in a front portion of the vehicle side portion 40A. The upper structure of the front pillar 42 is different from that of the front pillar 12 (refer to FIG. 1 and the like) according to the first embodiment.

The front pillar 42 includes a front framework 44 on its upper front side, and a rear framework 46 on its upper rear side. Each of the front framework 44 and the rear framework 46 is formed in the shape of a hollow column. The front framework 44 and the rear framework 46 are disposed in parallel with a gap therebetween in a direction orthogonal to their longitudinal direction, in an upwardly inclined manner at the vehicle rear side. Both of the front framework 44 and the rear framework 46 are connected to a vehicle vertically middle framework of the front pillar 42 at their lower ends, and are connected to a front end framework of the roof side rail 14 at their upper ends. Thus, a window opening 60 is formed in an upper portion of the front pillar 42. The front framework 44 is disposed on a front edge of the window opening 60, and the rear framework 46 is disposed on a rear edge of the window opening 60. The window opening 60 is covered with a transparent panel 66. The transparent panel 66 is disposed between the front framework 44 and the rear framework 46, and extends in a longitudinal direction in the upper portion of the front pillar 42.

As a supplementary description of the front framework 44 with reference to FIG. 1, the front framework 44 is disposed on the vertical edge of the front window opening 30, shown in FIG. 1, into which the windshield 36 is fitted. As to the front framework 44 shown in FIG. 4, for example, a well-known front framework structure is used.

Next, the rear framework 46, as a pillar framework, will be described. FIG. 5 is an enlarged sectional view showing a cross section taken along line 5-5 of FIG. 4. FIG. 6 is a perspective view of a part (longitudinal middle portion) of the rear framework 46, in a state before the rear framework 46 is secured to a predetermined position of the vehicle. As shown in FIGS. 5 and 6, the rear framework 46 includes an outer panel 52 as a first panel, and an inner panel 54 as a second panel. Each of the outer panel 52 and the inner panel 54 is made of a metal plate (for example, an ultra-high tensile steel plate).

As shown in FIG. 5, the outer panel 52 is formed into, for example, a triangularly corrugated plate shape. The outer panel 52 is configured to include an outer wall 52A having an outward surface 52X that is covered with a lateral widthwise end portion 66A of the transparent panel 66. The outer wall 52A is inwardly inclined in a vehicle widthwise direction to the vehicle front side. The outer panel 52 includes a flange 52C, as a first flange, that is outwardly inclined in the vehicle widthwise direction to the vehicle rear side, at its rear end. In addition, the flange 52C configures a first end that is one end of the outer panel 52, when viewed in the longitudinal direction of the rear framework 46 (when viewed in the direction of FIG. 5), and that is provided in a portion other than the outer wall 52A. Furthermore, the outer panel 52 includes a corrugated-shaped middle wall 52B to connect between a rear end of the outer wall 52A and a front end of the flange 52C.

The inner panel 54 is disposed inside the outer panel 52 in the vehicle widthwise direction. The inner panel 54 and the outer panel 52 form a closed cross-sectional structure by welding. The inner panel 54 is formed so as to have an approximately V-shaped opened cross-section that is opened outwardly in the vehicle widthwise direction. In other words, the inner panel 54 includes a front wall 54A, at its vehicle front portion, that is outwardly inclined in the vehicle widthwise direction to the vehicle front side, and a rear wall 54B, at its vehicle rear portion, that is outwardly inclined in the vehicle widthwise direction to the vehicle rear side. At a rear end of the rear wall 54B, a flange 54F, as a second flange that configures one end of the inner panel 54, is provided.

As shown in FIG. 6, the flange 52C of the outer panel 52 and the flange 54F, which configures the one end of the inner panel 54, are welded by spot welding. The welded portions are hereinafter referred to as first welded portions 56. The first welded portions 56 are linearly formed in an overlapping portion 55 between the flange 52C of the outer panel 52 and the flange 54F of the inner panel 54, at intervals of a predetermined distance 56L.

As shown in FIG. 5, an end surface 54X of a vehicle widthwise outer end 54T, i.e. the other end of the inner panel 54, is butted against and welded to an inner surface end 52M, as a second end, that is the other end of the outer panel 52, when viewed in the longitudinal direction of the rear framework 46 (when viewed in the direction of FIG. 5), and which is located in an opposite surface 52Y to the outward surface 52X of the outer wall 52A. The welded portions are hereinafter referred to as second welded portions 58. As shown in FIG. 6, to form the second welded portions 58, welding beads 58B are linearly formed by welding at intervals of a predetermined distance 58L.

The distance 58L between the second welded portions 58 adjacent each other is set narrower than the distance 56L between the first welded portions 56 adjacent each other. The sum of welding areas of the second welded portions 58 is set larger than the sum of welding areas of the first welded portions 56.

As shown in FIG. 5, a part of a side outer panel 62 (also referred to as a "side member outer panel") is adjacently disposed outside the outer panel 52 in a secured manner. The side outer panel 62 configures an outside plate of the vehicle side portion 40A. The side outer panel 62 is disposed along an external surface of the outer panel 52. The side outer panel 62 includes an outer wall 62A that is overlapped with the outer wall 52A of the outer panel 52. To the outer wall 62A of the side outer panel 62, the end portion 66A of the transparent panel 66 is bonded through an adhesive 64.

To the rear framework 46, a pillar garnish 68 is attached by a not-illustrated attachment means. The pillar garnish 68 is disposed so as to cover the rear framework 46 from the inside of the vehicle. A weather strip 72 is attached at a rear end of the rear framework 46. A weather strip 74 is attached on the side of a front end of the front side door 70, between the rear framework 46 and the front side door 70.

Next, a method for manufacturing the front pillar 42, as a vehicle pillar, having the outer panel 52 and the inner panel 54 will be described, as well as the operation and effects of the present embodiment will be described.

In a method for manufacturing the front pillar 42 according to the present embodiment, as shown in FIG. 6, the flange 52C of the outer panel 52 and the flange 54F of the inner panel 54 are welded by spot welding. The end surface 54X of the vehicle widthwise outer end 54T of the inner panel 54 is butted against and welded to the inner surface end 52M of the outer panel 52 by laser welding, such that the welding beads 58B are formed linearly (in other words, in a stitched manner) at intervals of the predetermined distance 58L.

Since the butted and welded portions eliminate the need for providing welding flanges, the width of the rear framework 46 can be thereby reduced. As shown in FIG. 5, the end surface 54X of the vehicle widthwise outer end 54T of the inner panel 54 is butted against and welded to the inner surface end 52M, which is located in the opposite surface 52Y to the outward surface 52X of the outer wall 52A of the outer panel 52. Therefore, the welding beads 58B formed by welding do not face the transparent panel 66, but face a side approximately orthogonal to the transparent panel 66, when viewed in the longitudinal direction of the rear framework 46 (when viewed in the direction of FIG. 5). Accordingly, in the rear framework 46, the surface facing the lateral widthwise end portion 66A of the transparent panel 66 becomes continuous and flat. Furthermore, as shown in FIG. 6, since the welding beads 58B are linearly formed at intervals of the predetermined distance 58L in welding between the inner surface end 52M of the outer panel 52 and the vehicle widthwise outer end 54T of the inner panel 54, the total quantity of heat during welding is reduced, as compared with the case of, for example, continuous welding, as well as the heat can be dissipated into non-welded portions between the welding beads 58B during the welding. Therefore, it is possible to reduce a heat distortion caused by welding, thus allowing an improvement in welding accuracy.

As described above, according to the present embodiment, as shown in FIG. 5, in the rear framework 46, the member can be easily disposed on the outward surface 52X facing the transparent panel 66 in an overlapping manner, while the rear framework 46 has a reduced width, and the corner butt portion on the side of the transparent panel 66 can have improved welding accuracy.

In the rear framework 46, since the surface facing the lateral widthwise end portion 66A of the transparent panel 66 is continuous and flat, the outer wall 62A of the side outer panel 62 can be favorably overlapped with the outward surface 52X. Therefore, the rear end portion 66A of the transparent panel 66 can favorably adhere to the outer wall 62A of the side outer panel 62.

According to the present embodiment, as shown in FIG. 6, in the overlapping portion 55 of the flange 52C of the outer panel 52 and the flange 54F of the inner panel 54, welding is linearly performed at intervals of the predetermined distance 56L. Therefore, it is possible to prevent a heat distortion owing to welding, even in the vicinity of the welded portions, i.e. the first welded portions 56.

Furthermore, the sum of the welding areas of the second welded portions 58, which are welded portions between the inner surface end 52M of the outer panel 52 and the vehicle widthwise outer end 54T of the inner panel 54, is set larger than the sum of the welding areas of the first welded portions 56, which are welded portions between the flange 52C of the outer panel 52 and the flange 54F of the inner panel 54. Therefore, the strength of the butted and welded second welded portions 58 can be easily increased.

The vehicle pillar structure according to the present embodiment does not have any flanges to join the outer wall 52A of the outer panel 52 and the front wall 54A of the inner panel 54. The elimination of flanges brings about an increase in the cross-sectional area of the rear framework 46. An increase in the cross-sectional area of the rear framework 46 allows an improvement in the stiffness of the rear framework 46. Since an increased cross-sectional area of the rear framework 46 brings about an increased stiffness of the rear framework 46, both of the outer panel 52 and the inner panel 54, or one of the outer panel 52 or the inner panel 54 can be thin in thickness. Thinning the panels or panel facilitate reducing the weight of the rear framework 46. Furthermore, a reduction in the width of the rear framework 46 allows an improvement in the vehicle outside visibility of occupants.

Supplementary Explanation of Embodiments

In each of the above embodiments, the vehicle pillar structure according to the present disclosure is applied to the front pillar 12 or 42 shown in FIG. 1 or 4, but the vehicle pillar structure may be applied to, for example, a vehicle pillar other than the front pillar 12 or 42, such as a rear pillar 80 (refer to FIG. 1) provided in a rear portion of the vehicle, or the like. In the same manner, in each of the above embodiments, the method for manufacturing the vehicle pillar according to the present disclosure is applied to a method for manufacturing the front pillar 12 or 42, but the method may be applied to, for example, a method for manufacturing a vehicle pillar other than the front pillar 12 or 42, such as a method for manufacturing the rear pillar 80 (refer to FIG. 1) provided in the rear portion of the vehicle, or the like.

In the above second embodiment, the vehicle pillar structure according the present disclosure is applied to both of the left and right front pillars 42. However, the vehicle pillar structure according to the present disclosure may be applied to, for example, only the front pillar (42) on the side of a driver's seat.

Instead of the front framework 44 according to the second embodiment shown in FIG. 4, for example, a pillar framework to which the pillar upper framework 20 according to the first embodiment, as shown in FIG. 2 and the like, is downsized in the vehicle longitudinal direction may be disposed. In this case, for example, the vehicle front-side end portion of the transparent panel 66 shown in FIG. 5 may be joined to the side wall (32B) of the side outer panel (32) that is overlapped with the side wall (22B) of the outer panel (22), through an adhesive.

In the first embodiment, the second welded portions 28 are provided at the corner of the pillar upper framework 20 on the side of the windshield 36 and inside in the vehicle widthwise direction, as shown in FIG. 2. However, as a modification example, the second welded portions according to the present disclosure may be provided at the corner of the pillar upper framework on the side of the windshield and outside in the vehicle widthwise direction. In the case of providing the second welded portions at the corner of the pillar upper framework on the side of the windshield and on one side (inside or outside) in the vehicle widthwise direction, the inner panel including the inner wall disposed inside in the vehicle widthwise direction can be formed with relative ease, in the pillar upper framework.

In the above embodiment, the sum of the welding areas of the second welded portions 28 or 58, shown in FIG. 3 or 6, is set larger than the sum of the welding areas of the first welded portions 26 or 56, and this structure is preferable. However, for example, depending on materials for the first panel (outer panel 22 or 52) and the second panel (inner panel 24 or 54) and the like, the sum of the welding areas of the second welded portions (28 or 58) may be set equal to or slightly smaller than the sum of the welding areas of the first welded portions (26 or 56).

In the above embodiment, the end surface 24X or 54X of the other end (the front end 24T in the first embodiment, or the vehicle widthwise outer end 54T in the second embodiment) of the inner panel 24 or 54 is butted against and welded to the inner surface end 22M or 52M of the outer panel 22 or 52 by laser welding. However, arc welding may be used, instead of laser welding, and a cooling process may be applied after each welding process.

Furthermore, as a modification example of each of the above embodiments, the vehicle pillar structure according to the present disclosure may be applied to a vehicle pillar in which, at a corner of a pillar framework on the side of a transparent panel, a notched and projected-shaped end portion of a first panel is fitted with a notched and projected-shaped end portion of a second panel, and the projected portions have the same length as the thickness of the fitted panel. In the modification example, a portion in which "an end surface of the other end of the second panel is butted against a second end, the second end being the other end of the first panel in a longitudinal direction of the pillar framework, and the second end being located in an opposite surface to the outward surface of the outer wall", as described in claim 1, is present intermittently.

The above embodiments and the above modification examples may be performed in appropriate combination.

One example of the present disclosure is described above. However, the present disclosure is not limited to the above, but, as a matter of course, may be performed with various modifications other than the above, without departing from the scope of the invention.

What is claimed is:

1. A vehicle pillar structure comprising:
   a first panel that configures a part of a hollow columnar pillar framework disposed on an edge of a window opening in a vehicle side portion, the first panel including an outer wall having an outward surface covered with a lateral widthwise end portion of a transparent panel for covering the window opening;
   a second panel that configures a part of the pillar framework, the first panel and the second panel forming a closed cross-sectional structure by welding:
   a first welded portion at which a first end that is one end of the first panel in a longitudinal direction of the pillar framework is welded to one end of the second panel, the first end being provided in a portion other than the outer wall; and
   a second welded portion at which an end surface of the other end of the second panel is butted against and welded to a second end that is the other end of the first panel in the longitudinal direction of the pillar framework, the second ends being located in an opposite surface to the outward surface of the outer wall, welding beads being linearly formed at established intervals to form the second welded portions.

2. The vehicle pillar structure according to claim 1, wherein
   the first welded portions are linearly provided at established intervals in an overlapping portion between a first flange that configures the first end of the first panel and a second flange that configures the one end of the second panel, and
   the sum of welding areas of the second welded portions is set larger than the sum of welding areas of the first welded portions.

3. A method for manufacturing a vehicle pillar having a first panel and a second panel, the first panel constituting a part of a hollow columnar pillar framework disposed on an edge of a window opening in a vehicle side portion, the first panel including an outer wall having an outward surface covered with a lateral widthwise end portion of a transparent panel for covering the window opening, the second panel constituting a part of the pillar framework, the first panel and the second panel forming a closed cross-sectional structure by welding, the method comprising the steps of:
   welding a first end that is one end of the first panel in a longitudinal direction of the pillar framework to one end of the second panel, the first end being provided in a portion other than the outer wall; and
   butting and welding an end surface of the other end of the second panel against and to a second end that is the other end of the first panel in the longitudinal direction of the pillar framework, the second end being located in an opposite surface to the outward surface of the outer wall, welding beads being linearly formed at established intervals by the welding.

4. The method according to claim 3, further comprising the step of:

performing linear welding at established intervals in an overlapping portion between a first flange that configures the first end of the first panel and a second flange that configures the one end of the second panel, wherein the sum of welding areas of welded portions between the other end of the first panel and the other end of the second panel is set larger than the sum of welding areas of welded portions between the first flange of the first panel and the second flange of the second panel.

* * * * *